United States Patent [19]

Lawson

[11] Patent Number: 4,622,024

[45] Date of Patent: Nov. 11, 1986

[54] APPARATUS AND METHOD FOR PRESTRETCHING AND TENSIONING FLEXIBLE DRIVE MEMBERS

[75] Inventor: Lawrence J. Lawson, Troy, Mich.

[73] Assignee: Dominion Tool & Die Company, Roseville, Mich.

[21] Appl. No.: 605,490

[22] Filed: Apr. 30, 1984

[51] Int. Cl.[4] .............................................. F16H 7/10
[52] U.S. Cl. .................... 474/102; 474/109; 254/228
[58] Field of Search ............... 474/102, 109, 110, 103, 474/106, 107, 136; 254/228

[56] References Cited

U.S. PATENT DOCUMENTS

| 3,638,781 | 2/1972 | Comley | 474/109 |
|---|---|---|---|
| 3,823,614 | 7/1974 | Fava et al. | 474/102 |
| 4,283,181 | 8/1981 | Sproul | 474/110 |
| 4,283,182 | 8/1981 | Kraft | 474/110 |
| 4,284,192 | 8/1981 | Taylor | 474/109 |
| 4,437,648 | 3/1984 | Thorn et al. | |
| 4,478,595 | 10/1984 | Hayakawa et al. | 474/109 |

FOREIGN PATENT DOCUMENTS 143850 11/1981 Japan ................................ 474/109

*Primary Examiner*—James A. Leppink
*Assistant Examiner*—Bruce M. Kisliuk
*Attorney, Agent, or Firm*—Harness, Dickey & Pierce

[57] ABSTRACT

Apparatus and a method is disclosed herein whereby flexible drive members such as for example conventional V-belts may be automatically prestretched and tensioned to a particular predetermined value with both a high degree of reliability and repeatablity. The apparatus comprises a sensor for continuously monitoring the actual tension on the flexible member and providing a signal to a central control unit. A force generating apparatus is also interconnected with the central control unit and operates to exert a force such as to increase or decrease the tension to which the flexible member is subjected. Wrench means may also be provided which are connected to the central control unit and actuated thereby so as to lock the movable pulley member or the like in position once the predetermined tension has been achieved on the flexible interconnecting member.

7 Claims, 4 Drawing Figures

APPARATUS AND METHOD FOR PRESTRETCHING AND TENSIONING FLEXIBLE DRIVE MEMBERS

BACKGROUND OF THE INVENTION

The present invention relates to a method for setting the tension of flexible members and more particularly to a method for prestretching and tensioning of drive belts such as those used to drive accessory equipment on internal combustion engines.

Flexible members in the form of V-belts, toothed belts, chains, etc. for example are commonly used in a wide variety of applications to transfer driving power from one source to another. In each of these applications there is provided a pair of rotatable members between which the interconnecting flexible member extends, one being the driven member and the other being the driving member. Typically, one of these rotatable members will be supported in such a manner as to be linearly adjustably movable with respect to the other rotatable member. In many of these applications the ability of the driving member to transmit the forces to the driven member is directly dependent upon the frictional engagement between the flexible member and the driving and driven members respectively. The ability of this frictional engagement to transmit the required driving force generally varies directly with the tension exerted on the flexible member. Thus, it is necessary to insure that a minimum amount of tension is exerted on the interconnecting flexible member, however, care must be taken to avoid over-tensioning the flexible member as this may result in excessive wear of the flexible member and/or overloading of the bearings supporting the driven and/or driving members. Even in those applications wherein the flexible member is in the form of a chain or toothed belt and hence not solely dependent on frictional engagement to transmit driving forces, it is still important to insure that a minimum amount of tension is exerted thereon in order to insure proper engagement of the links or teeth with the rotatable members.

It should also be noted that many such flexible drive members experience a period of stretching or elongation during the initial period of use which may result in a significant reduction in the tension exerted thereon. This is particularly true with respect to V-belts and results from both seating of the belt within the pulley grooves as well as a stretching of the belt material. In order to overcome the potential problems that may result from such a reduction in the desired tension as a result of the stretching, it has become common practice to subject the new V-belt to a prestretching process. This typically involves subjecting the V-belt to a tension in excess of that to which it is ultimately to be set and thereafter relaxing the tension on the belt and repeating this cycle several times before setting the tension to the predetermined level. This same process may also be desirable in conjunction with installation of other types of flexible drive members as well.

In asembly line operations this prestretching and final tensioning of the various drive belts incorporated on the apparatus being assembled can become a relatively time consuming and costly process. Further, in those situations where the prestretching and tensioning is performed in a manual fashion, the degree of prestretching as well as the final tensioning of the belt may vary significantly from one installation to the next. This is also possible when presently available automatic equipment is used which merely applies a predetermined force to one of the driving or driven members via a pneumatic or hydraulic cylinder because excessive friction in the movable mounting or support of the driving or driven member may prevent the desired level of tension being applied to the flexible member.

The present invention, however, provides a method and apparatus for carrying out the method whereby V-belts and other flexible interconnecting members may be automatically subjected to both a prestretching and final tensioning process relatively easily and conveniently. The present invention includes a sensor assembly which may be attached to the flexible member at a convenient location and operates to continuously sense the tension to which the member is subjected. The sensor signal is supplied to central control means which operates to cycle force generating means which will vary the relative positions of the driving and driven members so as to thereby selectively increase and decrease the tension on the flexible member. The central control means may be programmed for any number of cyclic operations to properly prestretch and seat the flexible member and thereafter set the tension thereon to the final desired level. Suitable torque means such as an air wrench or the like are also connected to the central control means which will act to prevent operation thereof until such time as the desired cycling and final setting of the tension is completed. Thus, because the central control means continuously monitors and controls the actual tension exerted on the flexible member via the sensor and force generating means, each flexible member will be installed in substantially identical manner thereby eliminating the need for subsequent re-adjustment of the flexible member.

Additional advantages and features of the present invention will become apparent from the subsequent description and the appended claims taken in conjunction with the accompanying drawings.

DESCRIPTION OF THE PREFERRED EMBODIMENT

Figure 4:
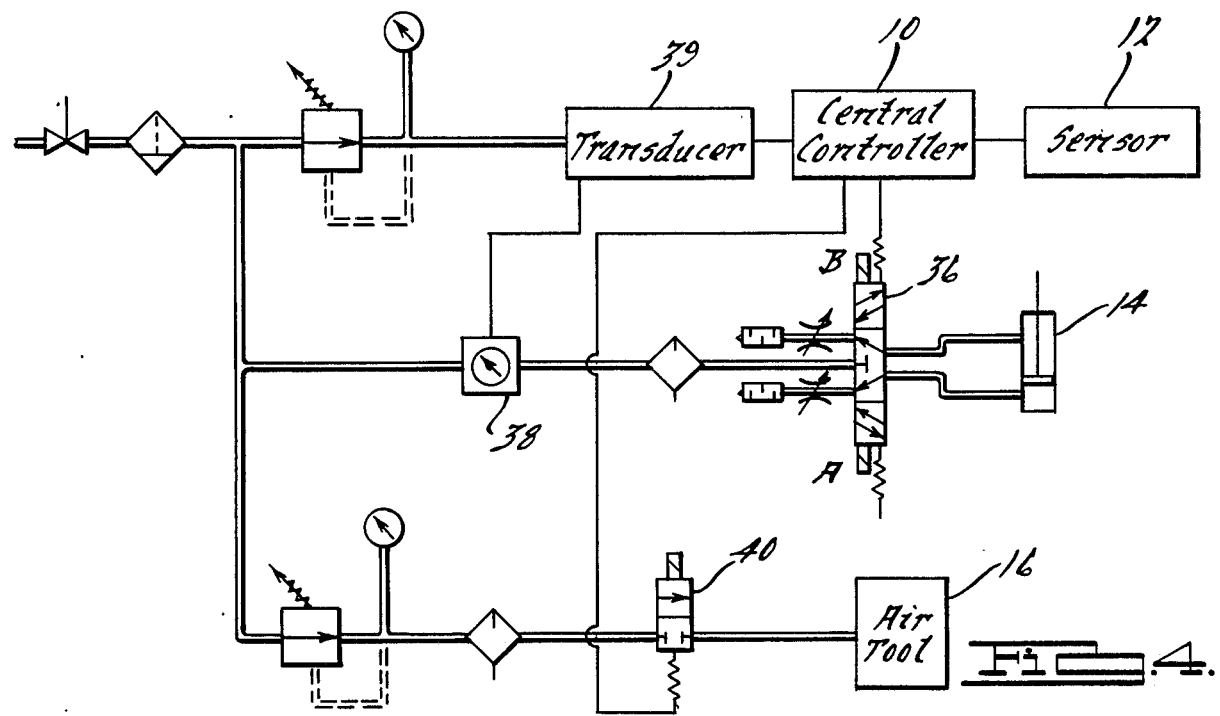
FIG. 4 is an electro pneumatic schematic diagram of the apparatus for use in practicing the method, all in accordance with the present invention.

Referring now to the drawings, the method and apparatus for use in carrying out the method are illustrated and will be described in greater detail. As shown in the schematic diagram of FIG. 4, the apparatus comprises a central control means 10 to which is connected a sensor 12, means for exerting a tensioning force 14 and torque means such as for example an air tool 16.

Figure 1:
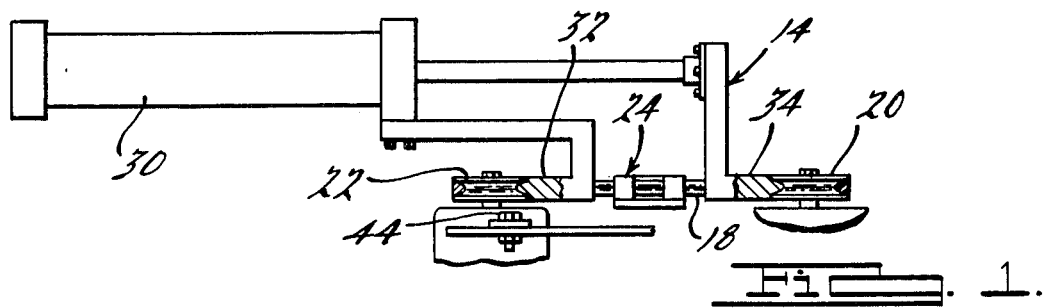
FIG. 1 is a plan view of a portion of the apparatus of the present invention shown in operative relationship to a conventional V-belt and pulley assembly.
Figure 2:
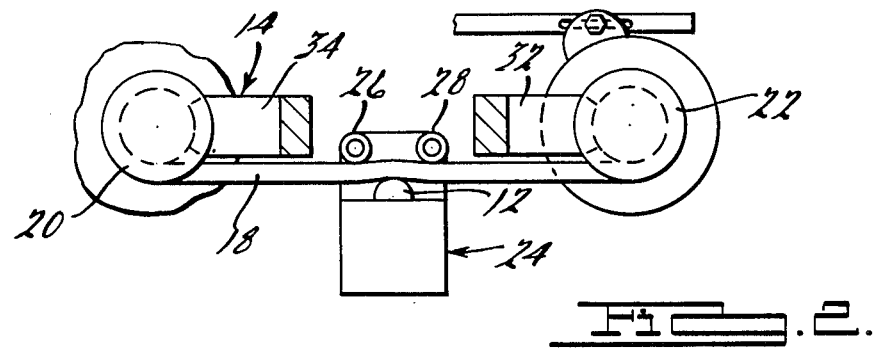
FIG. 2 is a fragmentary side elevational view similar to that of FIG. 1.
Figure 3:
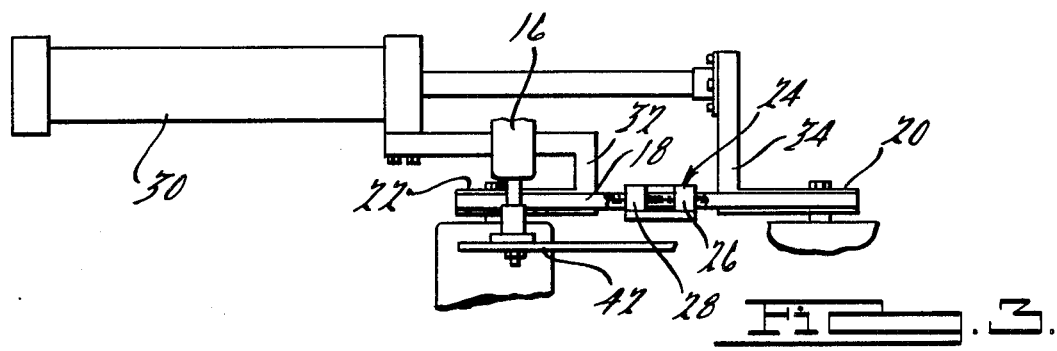
FIG. 3 is a view also similar to that of FIG. 1 but showing a torque tool applied to the fastener for securing the movable one of the pulley members.

Sensor 12 will preferably be in the form of a suitable pressure sensing device which may be removably attached to a flexible drive member such as for example a conventional V-belt 18 extending between a pair of relatively movable pulleys 20 and 22 and will operate to continuously provide a signal to the central control means 10 which is proportional to the tension exerted on the flexible member 18. As best seen with reference to FIG. 2, in one form sensor 12 is positioned on a carrier assembly 24 and in engagement with one side of flexible member 18. A pair of rollers 26 and 28 are also provided on the carrier assembly 24 and engage the opposite side of the flexible member being spaced outwardly in opposite directions from sensor 12. However, it should be noted that any arrangement may be employed which enables relatively quick and convenient attachment and removal of the sensor 12 from the flexible member 18 and is capable of generating a signal responsive to the tension exerted on the flexible member 18.

The force generating means 14 will of necessity be tailored for the particular application but may typically comprise a single or preferably double action piston assembly 30 which may be either pneumatically or hydraulically actuated. Suitable relatively movable arms 32 and 34 must be provided on the piston assembly 30 to engage a movable one (22 as shown) of the members 20, 22 between which the flexible member 18 extends and to exert a force thereon whereby the tension on the flexible member 18 may be varied. The arms may for example extend between and engage respective of the pair of pulley members 20, 22 or between a housing or any other relatively rigid non-movable structure and the movable one of the pulley members. As shown schematically in FIG. 4 force generating means 14 will be connected to a power source such as for example a supply of compressed air via a four way valve 36 operation of which is controlled by control means 10. A suitable pressure regulator 38 is also connected in the supply line and is operated by transducer means 39 which in turn is also controlled by control means 10.

Additionally, suitable torque means 16 such as for example an air actuated impact wrench or the like is connected to a power supply such as compressed air via valve 40. Valve 40 is connected to control means 10 which will operate to maintain it in a closed position so as to prevent operation of torque means 16 until such time as the prestretching operation cycle has been completed and the desired set tension has been applied to the flexible drive member.

The method of the present invention comprises initially attaching the sensor 12 an its carrier assembly 24 to the flexible member at an appropriate accessible location between the relatively movable drive and driven members 20 and 22. Also, the force generating means 14 is installed in operative relationship with the movable one of the drive and driven members 20 and 22.

The central control means 10 may then be actuated and will operate to in turn actuate the force generating means 14 via transducer 39 and pressure regulating means 38 whereby the tension on the flexible member 18 is progressively increased until a predetermined high level of tension is exerted on the flexible member 18 as indicated by the signal level supplied to the control means 10 from the sensor 12. Thereafter, the control means 10 will reverse the operation of the force generating means 14 by shifting valve 36 so as to thereby decrease the tension exerted on the flexible member 18 to a predetermined low value as indicated by the corresponding signal level provided to the control means 10 by the sensor 12. The control means 10 may be programmed to repetitively cycle the force generating means 14 so that the tension on the flexible member 18 is varied between the predetermined high and low values any desired number of times necessary to achieve the desired prestretching and/or proper seating thereof. It should be noted that throughout this cycling the control means 10 will maintain the torque means in a disabled condition via valve 40 thereby preventing premature tightening of the position securing means 42 associated with the relatively movable one of the driven and driving members 20, 22.

Once the prestretching cycling has been completed, the control means 10 will operate the force generating means 14 to exert a predetermined set tension on the flexible members 18. Once the desired set tension has been achieved the control means 10 will then operate to open valve 40 to thereby enable operation of the torque means which may be applied to the securing fastener 44 to tighten same thereby locking the driven and driving members 20, 22 in the desired relative positions.

Thus, as may now be appreciated, the present invention offers significant advantages over previous methods of tensioning of such flexible drive members such as and particularly V-belts and timing belts employed on internal combustion engines. Because control of the present method is substantially automatic once actuated, there is established a high level of reliability and confidence that once the optimum criteria for prestretching and tensioning of the flexible member has been determined, it will be followed substantially identically through successive installations and the variables attendant with human control of the operation are substantially eliminated.

While it will be apparent that the preferred embodiment of the invention disclosed is well calculated to provide the advantages and features above stated, it will be appreciated that the invention is susceptible to modification, variation and change without departing from the proper scope or fair meaning of the subjoined claims.

I claim:

1. A method for prestretching and tensioning an interconnecting member extending between a pair of relatively movable members, said method comprising:

applying sensor means to said interconnecting member, said sensor means being operative to provide a signal proportional to the tension exerted on said interconnecting member to control means;

installing force generating means for moving one of said relatively movable members with respect to the other movable member to thereby selectively vary the tension of said interconnecting member;

actuating said control means to operate said force generating means so as to increase the tension on said interconnecting member until said sensor provides a signal of a first predetermined value to said control means, said control means thereafter actuating said force generating means to decrease the tension on said interconnecting member until said sensor provides a signal of a second predetermined value to said control means;

said control means thereafter actuating said force generating means to adjust the tension on said interconnecting member until said sensor means provides a signal of a third predetermined value to said control means, said control means thereafter maintaining said force generating means whereby the tension on said interconnecting member is maintained at a level corresponding to said third predetermined value;

securing fastener means associated with said movable one of said relatively movable members so as to secure said movable member in a position whereby the tension on said interconnecting member is maintained at said level by said relatively movable members; and thereafter removing said sensor and said force generating means.

2. The method as set forth in claim 1 wherein said control means operates to cycle said force generating means to repetitively vary the tension on said interconnecting member between levels corresponding to said first and second predetermined signals a plurality of times.

3. The method as set forth in claim 1 wherein said control means operates to enable actuation of torque means for securing said fastening means while said force generating means maintains the tension on said interconnecting member responsive to said third predetermined signal.

4. A method for automatically prestretching and setting the tension on a drive belt extending between a pair of pulleys on an internal combustion engine said method comprising:

applying a sensor to said drive belt intermediate said pulleys, said sensor being connected to central control means and operative to supply a signal thereto proportional to the tension exerted on said drive belt;

installing force generating means between said pulleys, operation of said force being controlled by said central control means whereby tension exerted on said drive belt may be selectively varied;

actuating said control means whereby said force generating means increases the tension on said drive belt until said sensor supplies a signal to said control means indicating a first predetermined level of tension has been reached, said control means thereafter operating said force generating means to reduce the tension on said drive belt until said sensor supplied a signal to said control means indicating a second predetermined level of tension has been reached, said control means operating to adjust said force generating means until said sensor supplied a signal to said control means indicating a third predetermined level of tension on said drive belt has been reached;

applying torque means to fastening means asssociated with one of said pulleys, operation of said torque means being controlled by said control means whereby said control means enables actuation of said torque means in response to receipt of said third predetermined level signal from said sensor; and thereafter removing said sensor means from said drive belt, said force generating means and said torque means, said drive belt being maintained at said third predetermined level of tension by said pulleys.

5. The method as set forth in claim 4 wherein said control means operates to prevent operation of said torque means prior to receipt of said third predetermined level signal.

6. Apparatus for selectively tensioning a flexible drive member extending between a relatively fixedly supported rotatable member and a relatively movably supported rotatable member, said apparatus comprising:

central control means;

sensor means removably attached to said flexible drive member and independent of the tensioning of the drive member and operative to continuously directly sense the tension exerted on said flexible drive member and supply a signal proportional thereto to said control means;

force generating means operatively connected to said control means, said force generating means being operative to effect non-rotating movement of said movably supported rotatable member whereby the tension on said flexible member may be varied under the control of said control means and in response to said signal received from said sensor.

7. An apparatus as set forth in claim 6 wherein said apparatus further comprises torque means for securing fastening means associated with said movably supported rotatable member to prevent further movement thereof, said torque means being operatively connected to said control means whereby said control means may selectively prevent operation of said torque means.

* * * * *